US012186942B1

(12) United States Patent
Phung (10) Patent No.: US 12,186,942 B1
(45) Date of Patent: Jan. 7, 2025

(54) APPARATUS FOR FORMING AND APPLYING ARTIFICIAL FINGERNAILS

(71) Applicant: Cuong Phung, Findlay, OH (US)

(72) Inventor: Cuong Phung, Findlay, OH (US)

(\*) Notice: Subject to any disclaimer, the term of this patent is extended or adjusted under 35 U.S.C. 154(b) by 782 days.

(21) Appl. No.: 17/315,240

(22) Filed: May 7, 2021

Related U.S. Application Data

(60) Provisional application No. 63/103,736, filed on Aug. 24, 2020, provisional application No. 63/101,584, filed on May 7, 2020.

(51) Int. Cl.
| | |
|---|---|
| *B29C 33/38* | (2006.01) |
| *A45D 29/00* | (2006.01) |
| *A45D 31/00* | (2006.01) |
| *B29C 45/00* | (2006.01) |
| *B29C 45/04* | (2006.01) |
| *G06T 7/00* | (2017.01) |
| *G06V 40/10* | (2022.01) |
| *B29L 31/00* | (2006.01) |

(52) U.S. Cl.
CPC .......... *B29C 33/3842* (2013.01); *A45D 29/00* (2013.01); *B29C 45/00* (2013.01); *B29C 45/0441* (2013.01); *B29C 45/045* (2013.01); *G06T 7/97* (2017.01); *G06V 40/107* (2022.01); *A45D 31/00* (2013.01); *A45D 2200/052* (2013.01); *A45D 2200/205* (2013.01); *B29L 2031/718* (2013.01); *G06T 2207/10028* (2013.01); *G06T 2207/20081* (2013.01); *G06T 2207/30196* (2013.01)

(58) Field of Classification Search
CPC .. A45D 31/00; A45D 2031/005; A45D 29/00; A45D 29/004; A45D 2029/005; A45D 29/22; A45D 29/18; B29L 2031/718; B29C 45/0441; B29C 45/045; B29C 45/06; B29C 2045/0458; B29C 2035/0827; B29C 2045/0075; B29C 33/06; B29C 35/0805
See application file for complete search history.

(56) References Cited

U.S. PATENT DOCUMENTS

| | | | | |
|---|---|---|---|---|
| 2009/0092310 | A1* | 4/2009 | Gifford | .................... A61Q 3/00 |
| | | | | 382/141 |
| 2013/0327350 | A1* | 12/2013 | Huynh | ................... A45D 31/00 |
| | | | | 132/73 |

FOREIGN PATENT DOCUMENTS

| | | | | |
|---|---|---|---|---|
| DE | 202007005765 U1 * | 8/2007 | ............. | A45D 29/22 |

\* cited by examiner

*Primary Examiner* — Philip C Tucker
*Assistant Examiner* — Jimmy R Smith, Jr.
(74) *Attorney, Agent, or Firm* — The Law Office of Patrick F. O'Reilly III, LLC (57) ABSTRACT

An apparatus for forming and applying artificial fingernails is disclosed herein. In one or more embodiments, the apparatus includes a housing; a rotatable carousel disposed at least partially within the housing, the rotatable carousel including a plurality of fingernail molds that are configured to be rotated with the carousel, the plurality of fingernail molds configured to form a plurality of different fingernail shapes using an artificial fingernail molding material; a dispensing device disposed at least partially within the housing, the dispensing device configured to dispense the artificial fingernail molding material onto a fingertip portion of a user within a selected one of the plurality of fingernail molds; and a curing device, the curing device configured to cure the artificial fingernail molding material on the fingertip portion of the user so as to form an artificial fingernail having a particular shape.

16 Claims, 9 Drawing Sheets

SECTION A-A
FIG. 10

SECTION A-A
FIG. 11

FULL AUTOMATIC VERSION

APPARATUS FOR FORMING AND APPLYING ARTIFICIAL FINGERNAILS

CROSS-REFERENCE TO RELATED APPLICATIONS

This patent application claims priority to U.S. Provisional Patent Application No. 63/101,584, entitled "Automation machine using A.I. and 3D camera to built an extension to made longer nail using poly gel polish and poly gel color. A process to do designs and french manicure on the nails bed and artificial nails", filed on May 7, 2020, and U.S. Provisional Patent Application No. 63/103,736, entitled "Semi auto revolver for forming nails with polygel products: 1, preload, 2, preload on nails 3) injection mold into form", filed on Aug. 24, 2020; the disclosures of U.S. Provisional Patent Application No. 63/101,584 and U.S. Provisional Patent Application No. 63/103,736 are herein expressly incorporated by reference in their entireties.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to an apparatus for forming and applying artificial fingernails. More particularly, the apparatus relates to forming an artificial vanity fingernail that is formed and bonded directly to the natural fingernail. In one or more embodiments, the apparatus utilizes a mold block cavity with an artificial fingernail molding material being injected into the mold block cavity.

2. Background

Currently people wanting larger nails with unique shapes or features have several options which include growing them naturally, gluing plastic preformed nails on their own nail bed or using a polygel product that enables you to hand form a shape and cure it with ultraviolet (UV) light to form a solid that can then be shaped and refined as needed.

While all of these methods work, there is a level of dexterity needed in order to place, form and refine the artificial nail that leads some people to hire a nail technician to do the work. This work can be both time consuming and costly. Furthermore, the process for any of these methods involves gels or liquid glues, and can be a very messy process. If done improperly, the artificial nail will be removed, and the process starts over. Debonding agents can be used for this removal, but are not especially healthy and can harm sensitive skin.

For the foregoing reasons, an apparatus is needed that allows an almost perfectly formed nail to be generated every time, and eliminates the mess associated with the hand forming of an artificial nail.

BRIEF SUMMARY OF EMBODIMENTS OF THE INVENTION

Accordingly, the present invention is directed to an apparatus for forming and applying artificial fingernails that substantially obviates one or more problems resulting from the limitations and deficiencies of the related art.

In accordance with one or more embodiments of the present invention, there is provided an apparatus for forming and applying artificial fingernails that includes a housing; a rotatable carousel disposed at least partially within the housing, the rotatable carousel including a plurality of fingernail molds that are configured to be rotated with the carousel, the plurality of fingernail molds configured to form a plurality of different fingernail shapes using an artificial fingernail molding material; a dispensing device disposed at least partially within the housing, the dispensing device configured to dispense the artificial fingernail molding material onto a fingertip portion of a user within a selected one of the plurality of fingernail molds; and a curing device, the curing device configured to cure the artificial fingernail molding material on the fingertip portion of the user so as to form an artificial fingernail having a particular shape.

In a further embodiment of the present invention, the apparatus further comprises at least one camera configured to capture one or more images of the fingertip portion of the user, the one or more images of the fingertip portion of the user defining shape characteristics of the fingertip portion of the user.

In yet a further embodiment, the apparatus further comprises a carousel actuation device for rotating the rotatable carousel to a selected position.

In still a further embodiment, the apparatus further comprises a data processor operatively coupled to the at least one camera and the carousel actuation device of the rotatable carousel, the data processor including at least one hardware component, the data processor configured to execute computer executable instructions, the computer executable instructions comprising instructions for: (i) receiving the one or more images of the fingertip portion of the user from the at least one camera; (ii) extracting fingertip shape features of the user from the one or more images of the fingertip portion for providing inputs to an artificial intelligence algorithm; (iii) determining, by using the artificial intelligence algorithm, a particular one of the plurality of fingernail molds that most closely correlates with the fingertip shape features of the user; and (iv) rotating the rotatable carousel by means of the carousel actuation device to the selected position where the particular one of the plurality of fingernail molds that most closely correlates with the fingertip shape features of the user is in an operative position for forming the artificial fingernail.

In yet a further embodiment, the at least one camera comprises a three dimensional camera, and the one or more images of the fingertip portion of the user captured by the at least one camera comprises one or more three dimensional images of the fingertip portion of the user.

In still a further embodiment, the at least one camera comprises a plurality of cameras disposed at different locations around the fingertip portion of the user so as to capture images of the fingertip portion from different viewing angles.

In yet a further embodiment, the apparatus further comprises a finger aperture disposed in a side of the housing, the finger aperture configured to allow the fingertip portion of the user to be inserted into the selected one of the plurality of fingernail molds.

In still a further embodiment, the curing device comprises an ultraviolet light source and the artificial fingernail molding material comprises a polygel material, the ultraviolet light source configured to cure the polygel material on the fingertip portion of the user so as to form the artificial fingernail having the particular shape.

In yet a further embodiment, at least one of the plurality of fingernail molds is transparent to ultraviolet light produced by the ultraviolet light source so as to allow the polygel material on the fingertip portion of the user to be cured inside the at least one of the plurality of fingernail molds.

In still a further embodiment, at least some of the plurality of different fingernail shapes formed by the plurality of fingernail molds correspond to fingertip portions of different fingers of the user.

In yet a further embodiment, the dispensing device comprises at least one syringe configured to dispense the artificial fingernail molding material onto the fingertip portion of the user within the selected one of the plurality of fingernail molds.

In still a further embodiment, the apparatus further comprises a dispenser actuation device operatively coupled to the at least one syringe, the dispenser actuation device configured to engage a plunger of the syringe so as to dispense the artificial fingernail molding material onto the fingertip portion of the user.

In yet a further embodiment, the artificial fingernail molding material comprises a polygel material, and the at least one syringe is preloaded with polygel material.

In still a further embodiment, the curing device is disposed at least partially within the housing.

In yet a further embodiment, the curing device is disposed outside the housing.

In still a further embodiment, the curing device comprises an ultraviolet flashlight disposed outside of the housing.

In accordance with one or more other embodiments of the present invention, there is provided an apparatus for forming and applying artificial fingernails that includes a housing; at least one fingernail mold disposed at least partially within the housing, the at least one fingernail mold configured to form a particular fingernail shape using an artificial fingernail molding material; a dispensing device disposed at least partially within the housing, the dispensing device configured to dispense the artificial fingernail molding material onto a fingertip portion of a user within the at least one fingernail mold; and a curing device, the curing device configured to cure the artificial fingernail molding material on the fingertip portion of the user so as to form an artificial fingernail having a particular shape.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL
VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS
OF THE INVENTION

Figure 1:
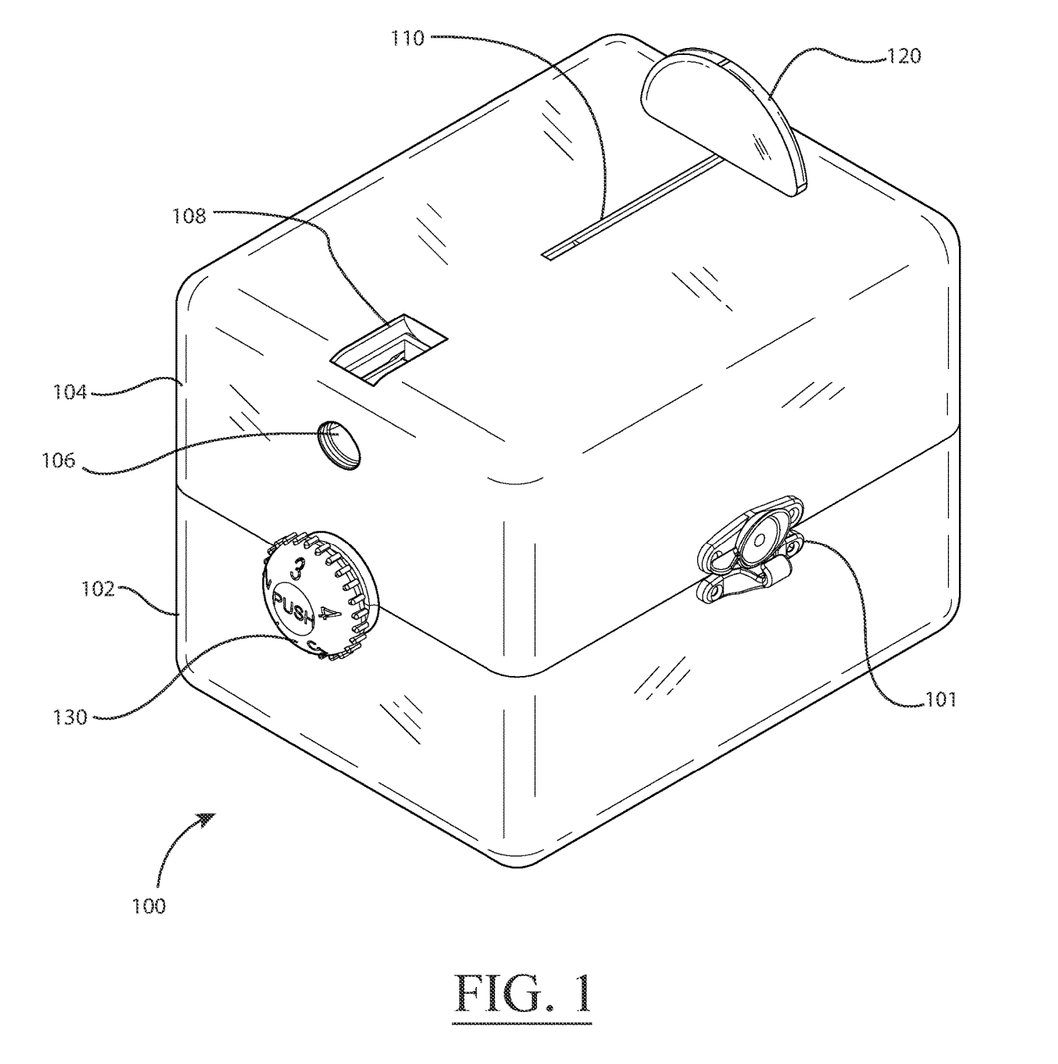
FIG. 1 is a top-side perspective view of an apparatus for forming and applying artificial fingernails, according to a first illustrative embodiment of the invention.

An illustrative embodiment of an apparatus for forming and applying artificial fingernails is seen generally at 100 in FIG. 1. With combined reference to FIGS. 1-11, the apparatus 100 comprises a housing 102, 104, a rotatable carousel (see FIG. 7) disposed within the housing 102, 104, the rotatable carousel including a plurality of fingernail molds (molds with lower and upper portions 142, 143—see FIG. 9) that are configured to be rotated with the carousel, the plurality of fingernail molds 142, 143 configured to form a plurality of different fingernail shapes using an artificial fingernail molding material (e.g., polygel); a dispensing device (e.g., syringes 124) disposed within the housing 102, 104, the dispensing device 124 configured to dispense the artificial fingernail molding material (e.g., polygel) onto a fingertip portion of a user within a selected one of the plurality of fingernail molds 142, 143; and a curing device (e.g., ultraviolet flashlight 180—see FIG. 14), the curing device 180 configured to cure the artificial fingernail molding material (e.g., polygel) on the fingertip portion of the user so as to form an artificial fingernail having a particular shape. In the illustrative embodiment, at least some of the plurality of different fingernail shapes formed by the plurality of fingernail molds 142, 143 correspond to fingertip portions of different fingers of the user (e.g., one mold corresponds to the index fingertip of the user, another mold corresponds to a thumb fingertip of the user, etc.). The fingertip portion of the user includes the natural nail on which the artificial fingernail is formed.

Figure 2:
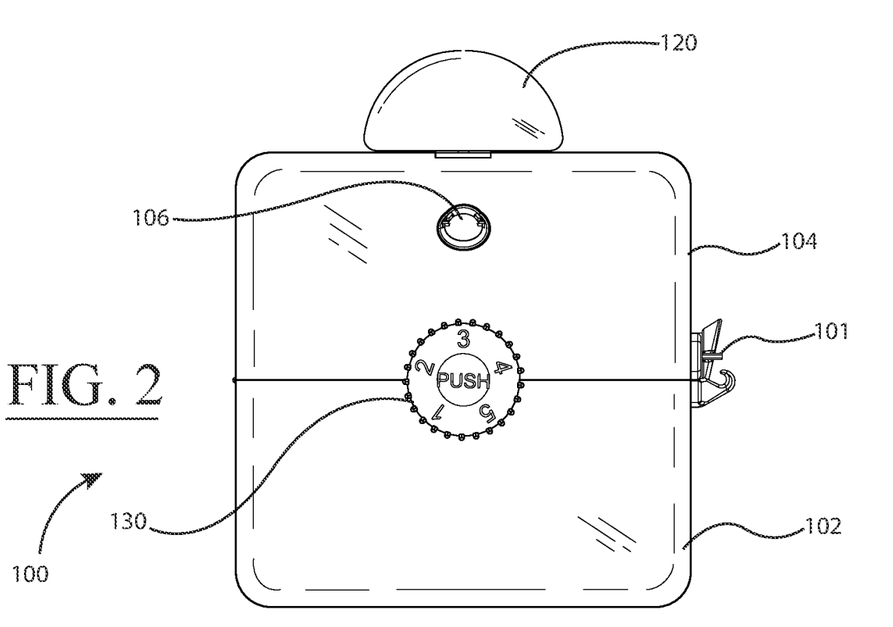
FIG. 2 is a front elevational view of the apparatus of FIG. 1.
Figure 3:
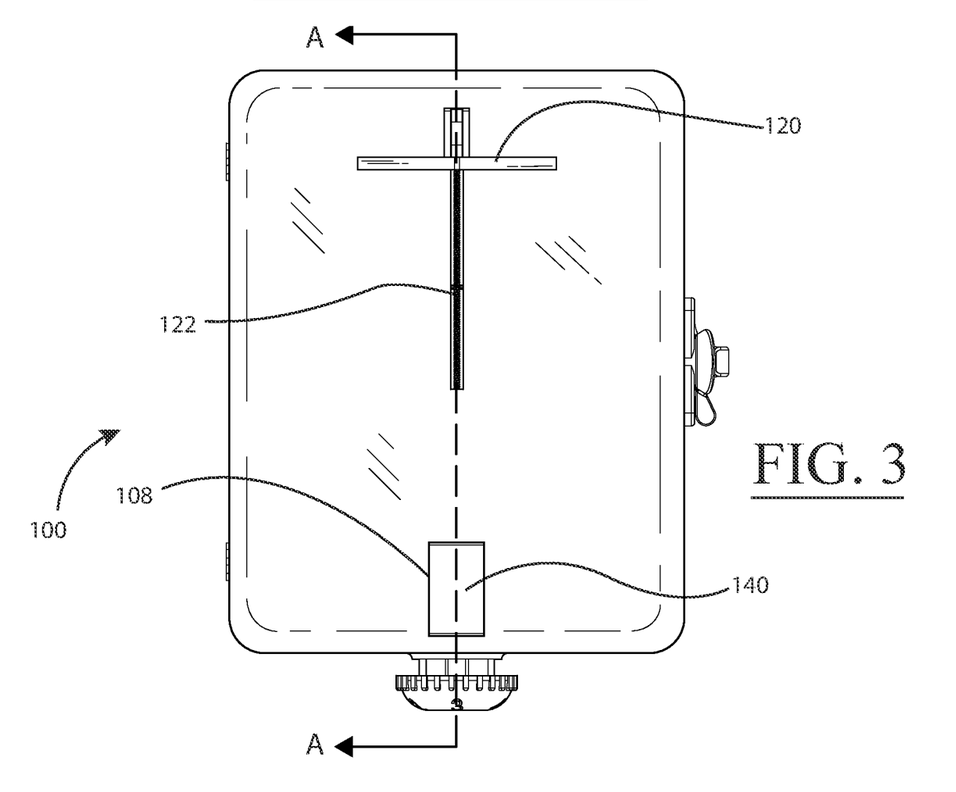
FIG. 3 is a top plan view of the apparatus of FIG. 1.
Figure 4:
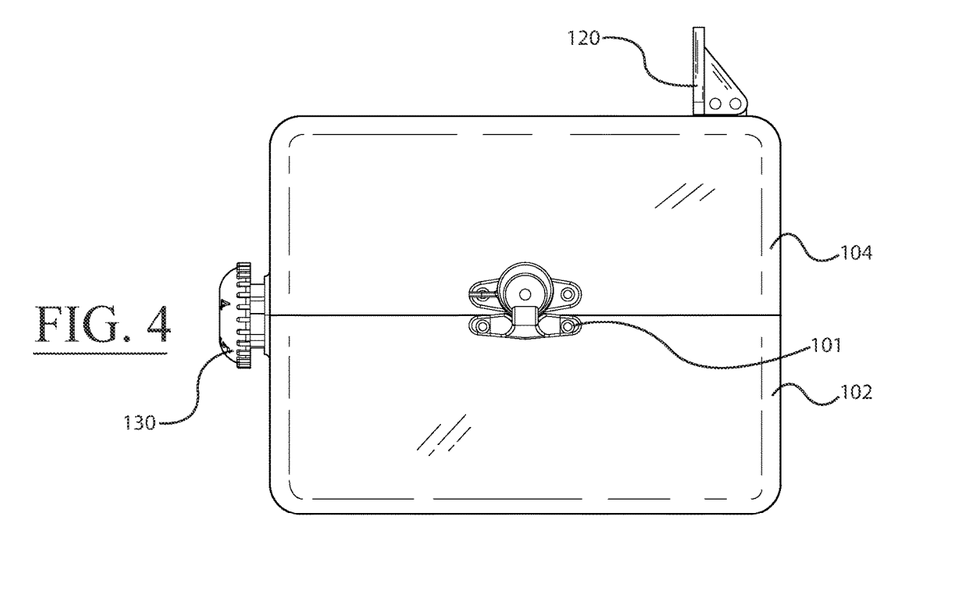
FIG. 4 is a first side elevational view of the apparatus of FIG. 1.

In the first illustrative embodiment, referring to FIGS. 1 and 2, the apparatus 100 further comprises a finger aperture 106 disposed in a side of the upper housing 104. The finger aperture 106 is configured to allow the fingertip portion of the user to be inserted into the selected one of the plurality of fingernail molds (see FIGS. 10 and 11).

Figure 8:
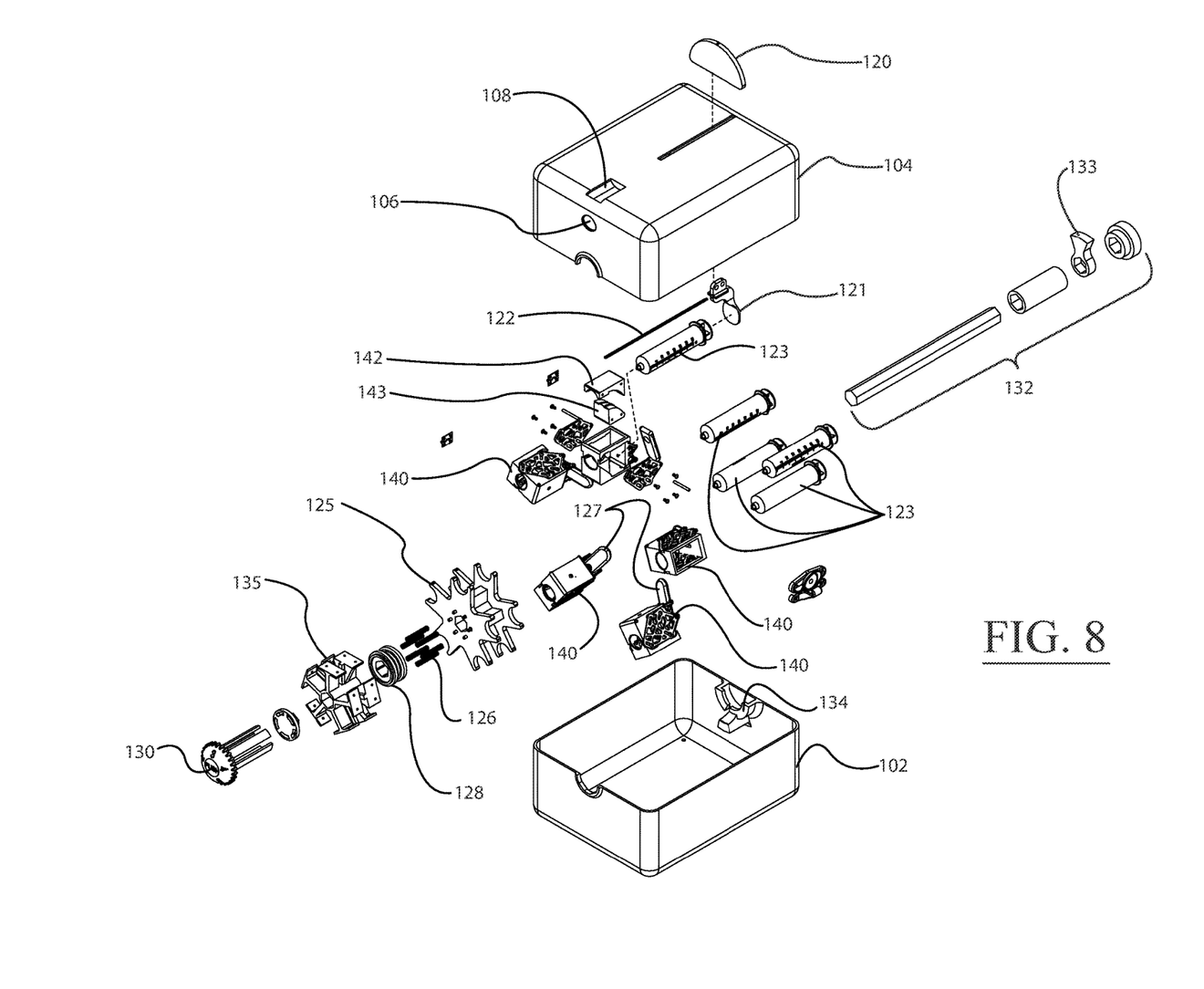
FIG. 8 is an exploded perspective view of the apparatus of FIG. 1.

In the first illustrative embodiment, the apparatus 100 further comprises a manual carousel actuation device 130 for allowing a user to rotate the rotatable carousel to a selected position (e.g., one of five different positions as indicated by the numbers 1-5 on the dial in FIG. 2). Also, in the first illustrative embodiment, the molds may be opened up by the user pushing inwardly on the button 130. As shown in FIG. 8, the carousel actuation device 130 is operatively coupled to the rotatable carousel by means of shaft assembly 132. A bearing of the shaft assembly 132 is received within the semi-circular slot 134 in the lower housing portion 102. A rotation limiter 133 (see FIG. 8) limits the rotation of the rotatable carousel to less than 360 degrees.

In the first illustrative embodiment, the dispensing device comprises a plurality of syringes 124 (see FIGS. 6 and 7) configured to dispense the artificial fingernail molding material (e.g., polygel 10—see FIG. 10) onto the fingertip portion of the user within the respective ones of the plurality of fingernail molds 142, 143. Each syringe 124 may snap into place in a respective notch on syringe carriage 125 (see FIG. 8).

In the first illustrative embodiment, the apparatus 100 further comprises a dispenser actuation device 120 (see FIG. 1) operatively coupled to the syringes 124. The dispenser actuation device 120 is configured to engage the plungers 123 of the syringes 124 so as to dispense the artificial fingernail molding material (e.g., polygel) onto the fingertip portion of the user (by means of actuator paddles 121 depressing the plungers 123 of the syringes 124 when the dispenser actuation device 120 is moved forward along the actuator slot 110). The dispenser actuation device 120 horizontally travels along the actuator rod 122 as it is displaced. Once the finger is aligned, the paddle 121 on top acts to move the plunger 123 and inject the nail. The paddles 121 may be spring-loaded back to avoid collision with fully extended syringe plungers 123 while changing mold sizes.

Figure 10:
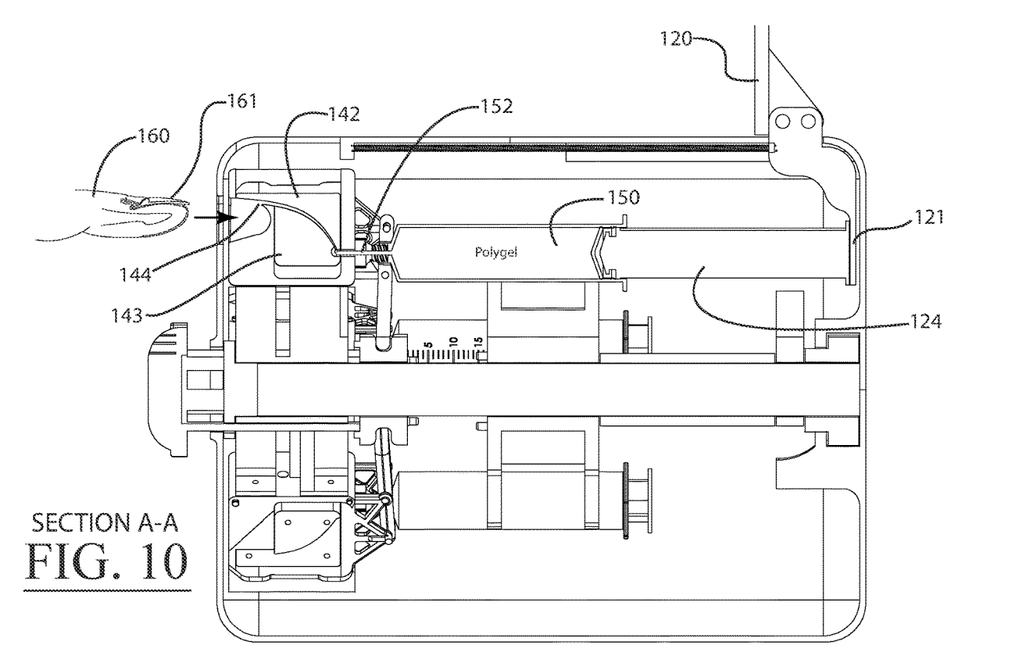
FIG. 10 is a longitudinal sectional view cut through the apparatus of FIG. 1, wherein the section is generally cut along the cutting-plane line A-A in FIG. 3.
Figure 11:
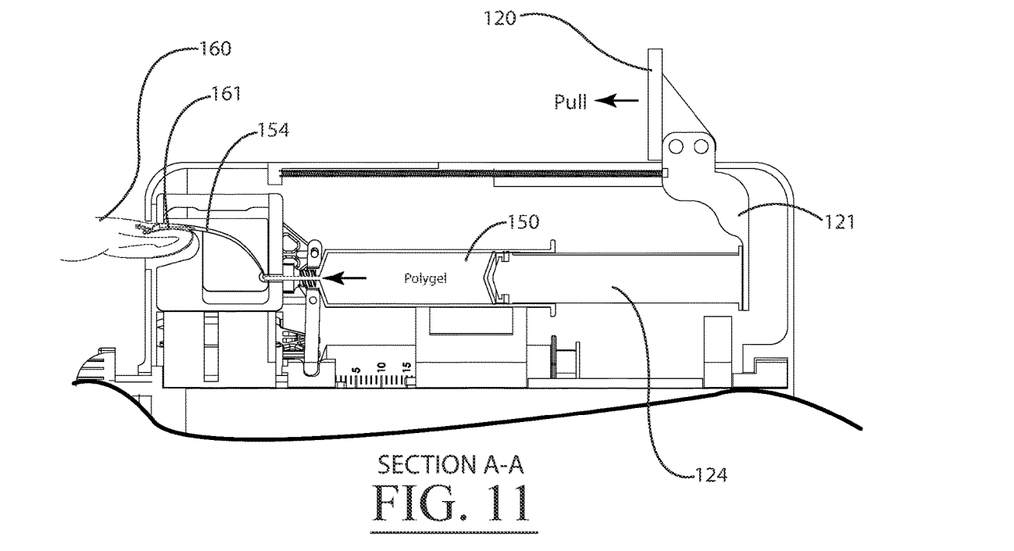
FIG. 11 is a partial longitudinal sectional view cut through the apparatus of FIG. 1, which illustrates the injection of the artificial fingernail molding material into the mold.

Referring to FIGS. 10 and 11, in the first illustrative embodiment, once the plunger 123 is depressed by a respective actuator paddle 121, the polygel 150 is dispensed through the polygel injection port 152, and into the polygel mold cavity 154 to form the artificial fingernail on top of the natural fingernail 161 of the finger 160 of the user.

In the illustrative embodiment, as described above, the artificial fingernail molding material may comprise a polygel material. Also, in the illustrative embodiment, the syringes 124 may be preloaded with the polygel material.

Figure 14:
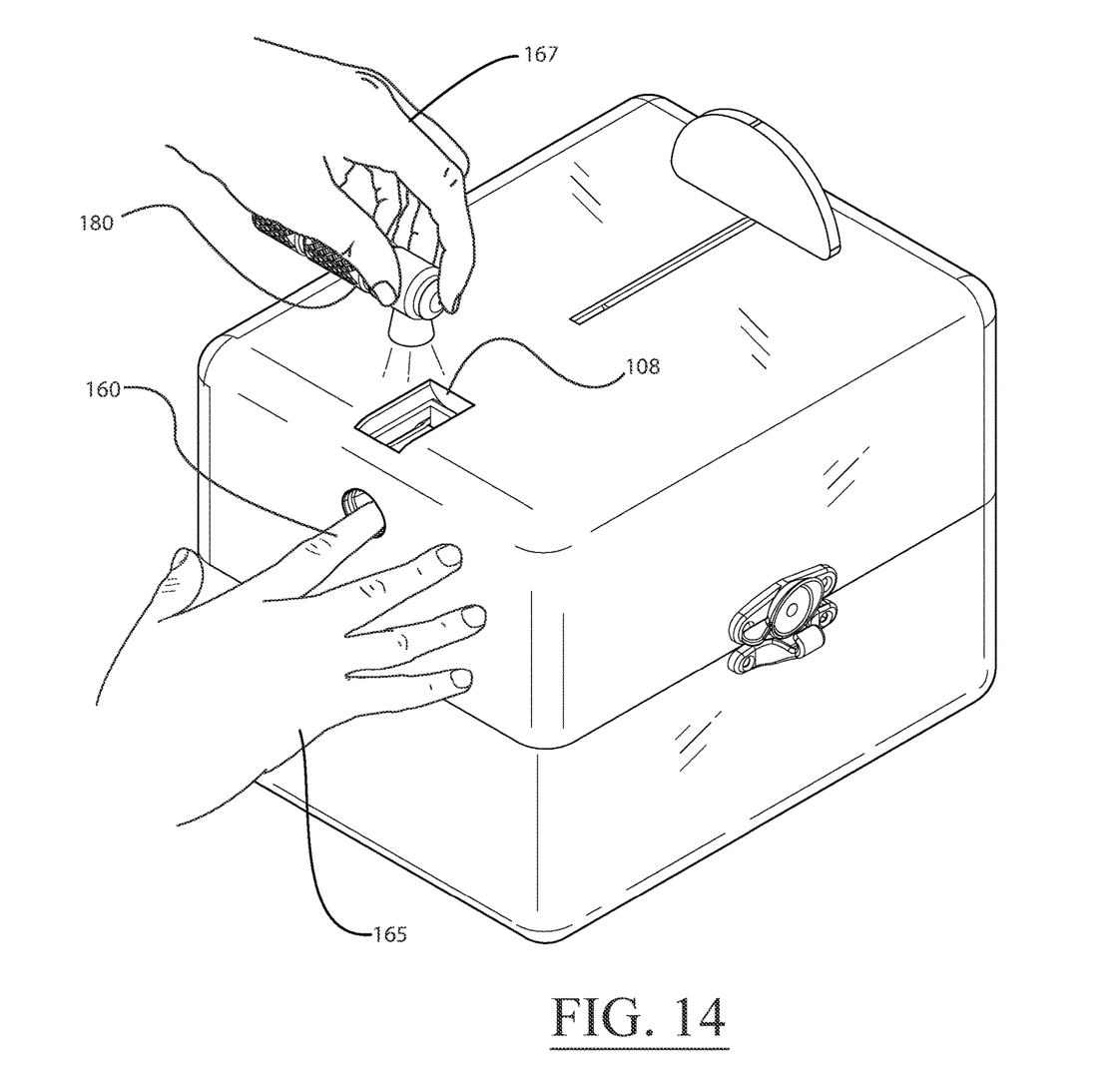
FIG. 14 is another perspective view of the apparatus of FIG. 1, wherein polygel material on a fingertip portion of a user is depicted being cured using an ultraviolet flashlight.

In the first illustrative embodiment, the curing device comprises an ultraviolet light source (e.g., ultraviolet flashlight 180—see FIG. 14). The ultraviolet light source is configured to cure the polygel material on the fingertip portion of the user so as to form the artificial fingernail having the particular shape. In the illustrative embodiment, each of the plurality of fingernail molds is transparent to ultraviolet light produced by the ultraviolet light source 180 so as to allow the polygel material on the fingertip portion of the user to be cured inside the fingernail molds (e.g., the lower and upper mold portions 142, 143 may be formed from a clear acrylic material).

In the first illustrative embodiment, as shown in FIG. 14, the curing device (e.g., ultraviolet flashlight 180) is disposed outside the housing. That is, a person (e.g., a nail technician) holds the ultraviolet flashlight 180 with his or her hand 167 and shines the ultraviolet light through the cure aperture 108 in the upper housing 104 to form the artificial fingernail on the finger 160 of the hand 165 of the user. Also, in the illustrative embodiment, the injection process can be monitored via the aperture 108 to the transparent mold block.

Figure 5:
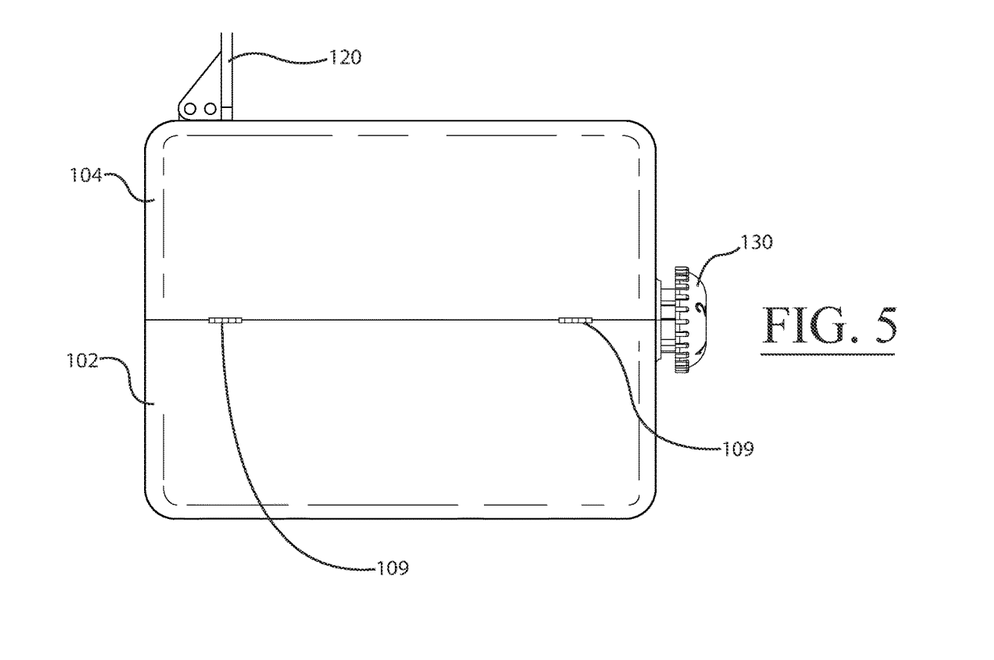
FIG. 5 is a second side elevational view of the apparatus of FIG. 1.
Figures 6, 7:
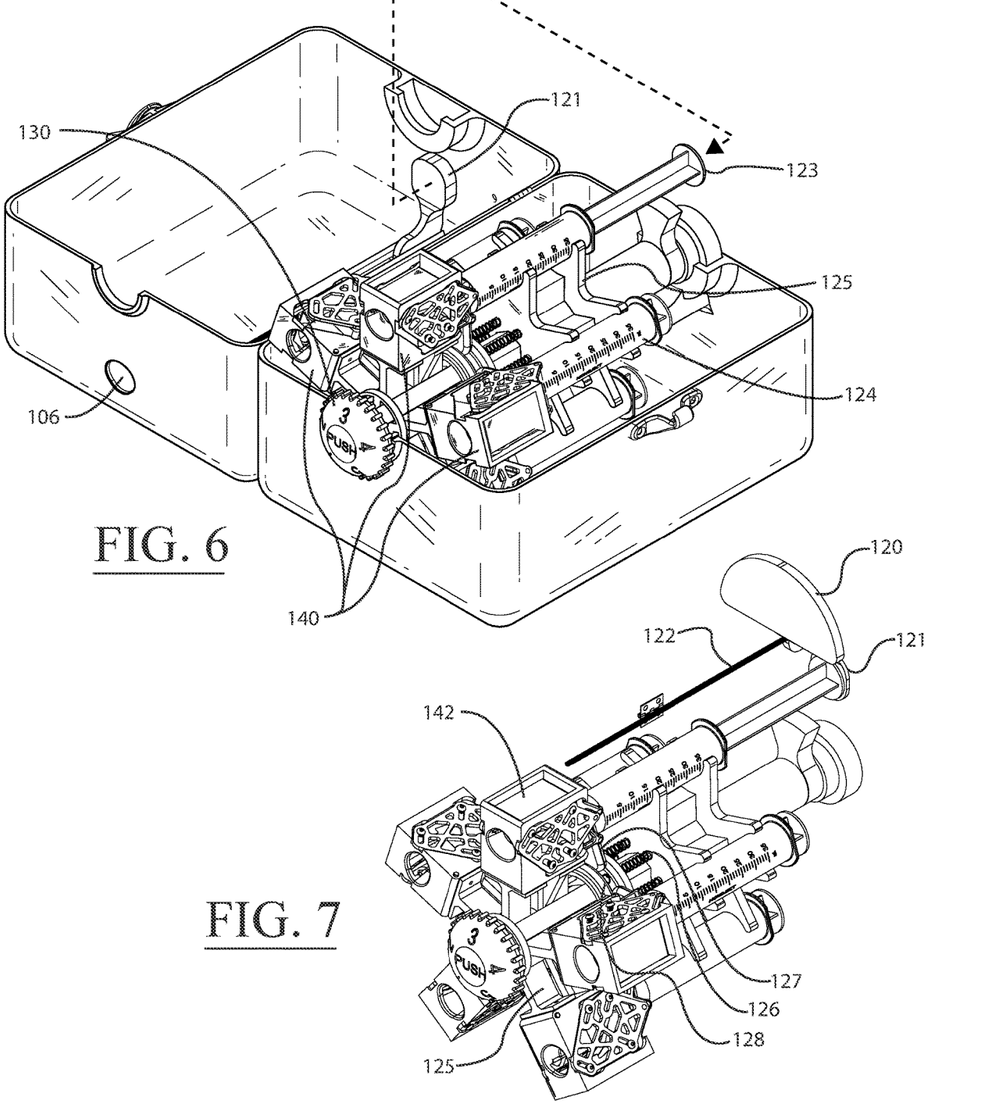
FIG. 6 is a perspective view of the apparatus of FIG. 1, wherein the lid of the housing has been opened in order to show the internal components of the apparatus.
FIG. 7 is a perspective view of the internal components of the apparatus of FIG. 1, wherein the housing of the apparatus has been removed.

With combined reference to FIGS. 1, 5, and 6 of the first illustrative embodiment, it can be seen that the upper housing portion 104 may be hingedly coupled to the lower housing portion 102 by means of hinge members 109. Advantageously, the hinge members 109 allow the housing 102, 104 to be opened for easy maintenance access to the rotatable carriage, fingernail molds 142, 143, etc. A housing latching device 101 is provided on the side of the housing 102, 104 opposite to the hinge members 109 so as to secure the housing sections 102, 104 in a closed position.

Figure 9:
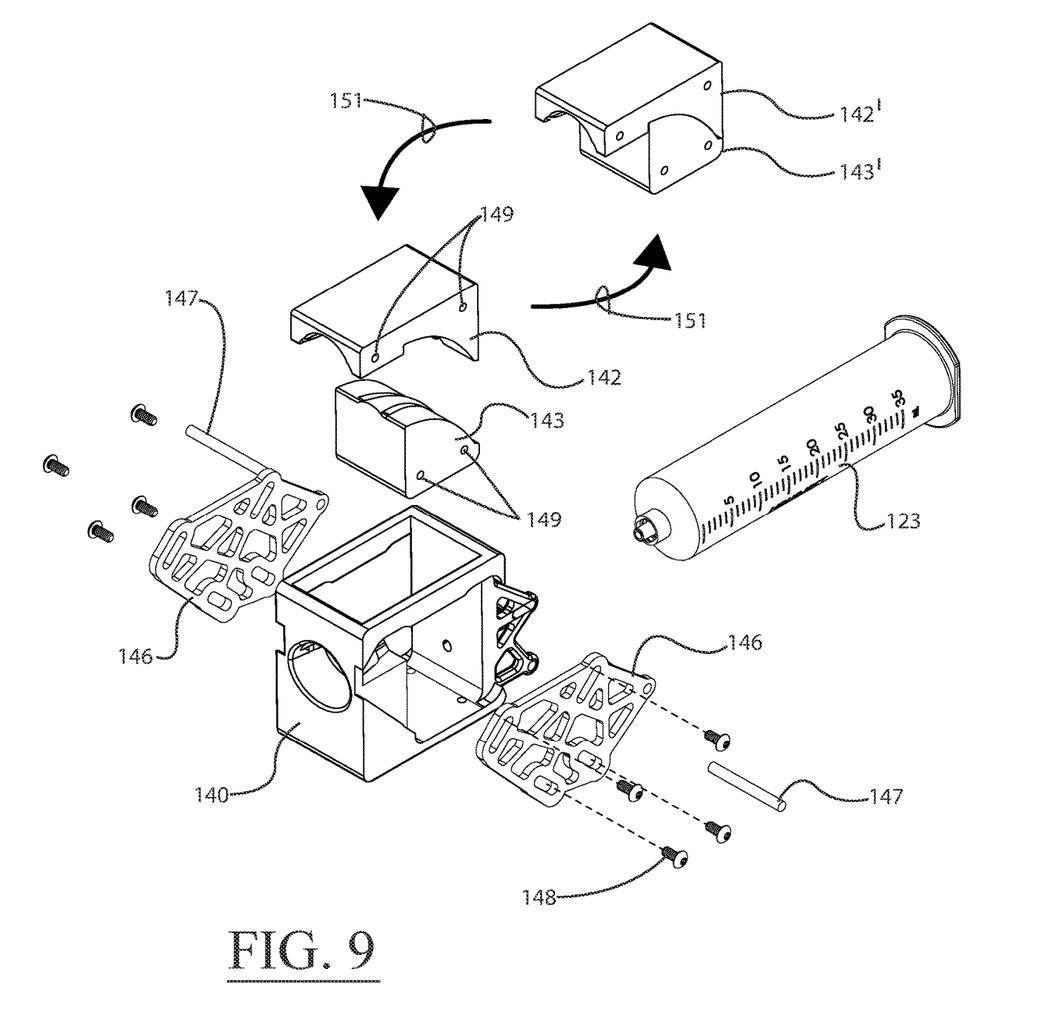
FIG. 9 is an exploded perspective view of one of the molding subassemblies of the apparatus of FIG. 1.

In the first illustrative embodiment, with combined reference to FIGS. 7-9, each of the fingernail molds 142, 143 may be configured to pivot open for release of the formed artificial nail. That is, when the carousel actuation device 130 is pushed in by the user, the ring member 128 on the shaft member of the shaft assembly 132 displaces the mold block paddles 127, which results in the fingernail molds 142, 143 being pivoted open. The insertion of the finger 160 of the user into the finger aperture 106 only occurs when the fingernail molds 142, 143 are closed. The fingernail molds 142, 143 are spring-loaded closed (e.g., by springs 126) to the default position so as to prevent pinching. In the illustrative embodiment, a single push of the activation button 130 opens all five molds.

In the first illustrative embodiment, referring to FIGS. 8 and 9, each fingernail mold 142, 143 may be supported by a mold block holder 140. Mold side plates 146 may be provided on opposed sides of each mold block holder 140. Mold screws 148 may pass through slots in the mold side plates 146 and attach to apertures 149 in the top and bottom mold portions 142, 143. Mold rods 147 may pass through other slots in the mold side plates 146. The mold block holders 140 are supported on mold block carriage 135 (see FIG. 8).

Figure 12:
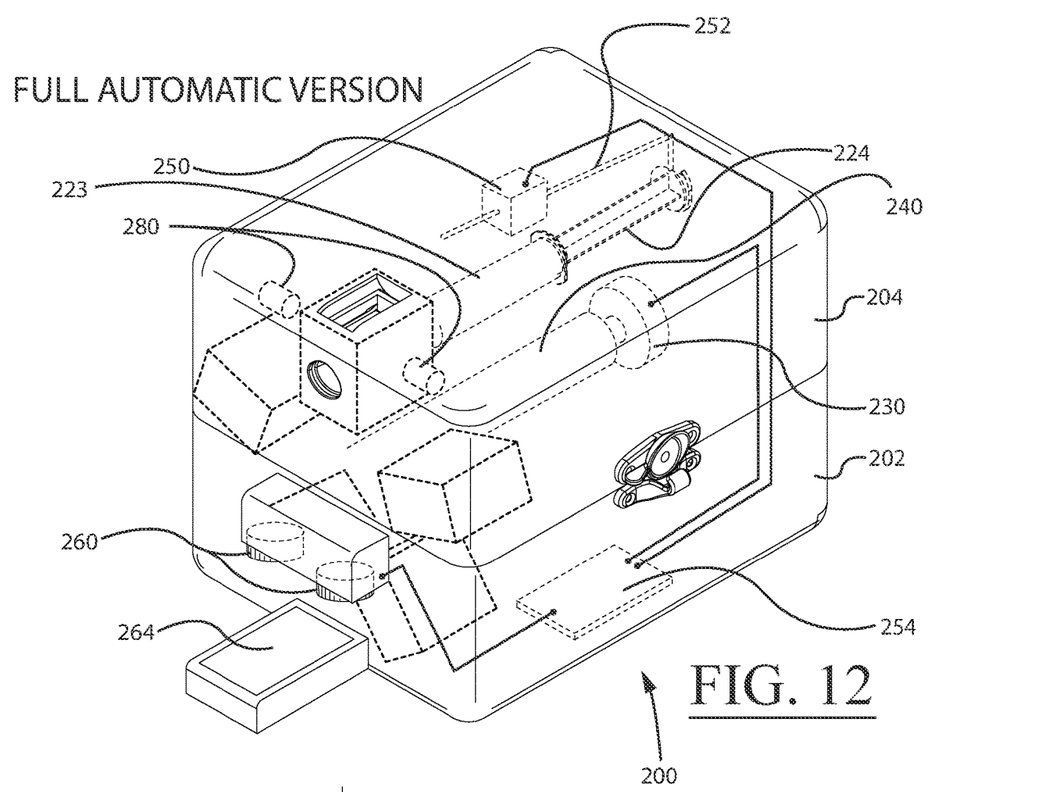
FIG. 12 is a top-side perspective view of an apparatus for forming and applying artificial fingernails, according to a second illustrative embodiment of the invention.

A second illustrative embodiment of an apparatus for forming and applying artificial fingernails is seen generally at 200 in FIG. 12. Referring to this figure, it can be seen that, in some respects, the second illustrative embodiment is similar to that of the first illustrative embodiment. Moreover, many elements are common to both such embodiments. For the sake of brevity, the elements that the second embodiment of the apparatus has in common with the first embodiment will not be discussed in detail because these components have already been described above.

Like the apparatus 100 described above, the apparatus 200 of the second illustrative embodiment generally comprises a housing 202, 204, a rotatable carousel disposed within the housing 202, 204, the rotatable carousel including a plurality of fingernail molds (molds with lower and upper portions) that are configured to be rotated with the carousel, the plurality of fingernail molds configured to form a plurality of different fingernail shapes using an artificial fingernail molding material (e.g., polygel); a dispensing device (e.g., syringes 223 with plungers 224) disposed within the housing 202, 204, the dispensing device 223 configured to dispense the artificial fingernail molding material (e.g., polygel) onto a fingertip portion of a user within a selected one of the plurality of fingernail molds; and a curing device (e.g., ultraviolet light-emitting diode (LED) lamps 280), the curing device 280 configured to cure the artificial fingernail molding material (e.g., polygel) on the fingertip portion of the user so as to form an artificial fingernail having a particular shape. In the illustrative embodiment, at least some of the plurality of different fingernail shapes formed by the plurality of fingernail molds correspond to fingertip portions of different fingers of the user (e.g., one mold corresponds to the index fingertip of the user, another mold corresponds to a thumb fingertip of the user, etc.).

Figure 13:
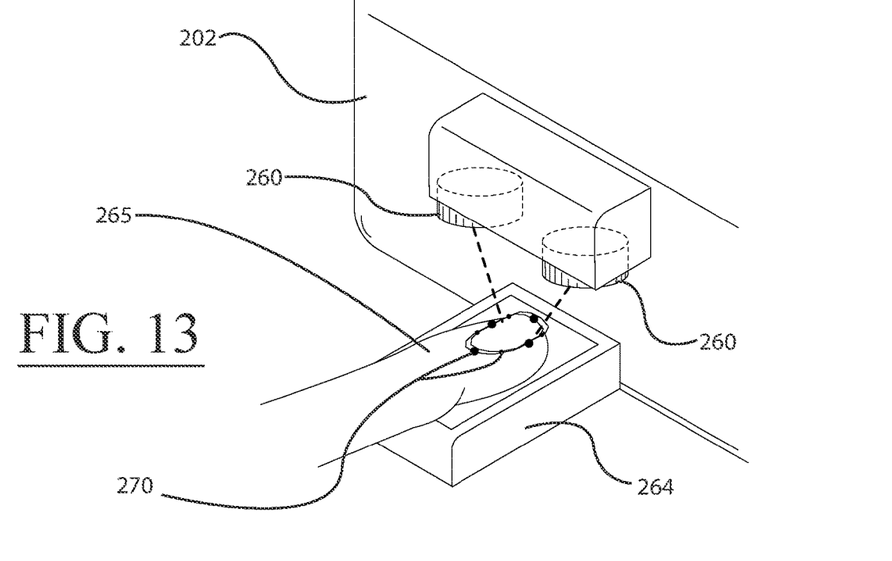
FIG. 13 is a partial perspective view of the imaging portion of the apparatus of FIG. 12, which illustrates the manner in which a fingertip of a user is imaged.

However, unlike the apparatus 100 described above, the apparatus 200 of the second illustrative embodiment further comprises a plurality of cameras 260 configured to capture one or more images of the fingertip portion of the user, where the one or more images of the fingertip portion of the user define shape characteristics of the fingertip portion of the user (e.g., in FIG. 13, the dots 270 represent points mapping out the edge of the natural fingernail of user finger 265, large dots show the width and length of the natural fingernail, while small dots show the shape of the natural fingernail). In the illustrative embodiment of FIGS. 12 and 13, each camera 260 is disposed at a different location relative to the fingertip portion of the user so as to capture images of the fingertip portion from different viewing angles. The finger 265 of the user is placed on the finger placement bed 264 during the imaging thereof.

In one or more embodiments, one or more of the cameras 260 may comprise a three dimensional (3D) camera, and the one or more images of the fingertip portion of the user captured by the camera(s) 260 may comprise one or more three dimensional images of the fingertip portion of the user.

Referring again to FIGS. 12 and 13 of the second illustrative embodiment, the apparatus 200 further comprises a data processor (e.g., a printed circuit board (PCB) 254 with a microprocessor and memory) operatively coupled to the camera 260 and a carousel actuation device (e.g., motor 230) of the rotatable carousel. In the illustrative embodiment, the data processor 254 is configured to execute computer executable instructions for: (i) receiving the one or more images of the fingertip portion of the user from the cameras 260; (ii) extracting fingertip shape features of the user from the one or more images of the fingertip portion for providing inputs to an artificial intelligence algorithm (e.g., a trained neural network); (iii) determining, by using the artificial intelligence algorithm (e.g., a trained neural network), a particular one of the plurality of fingernail molds that most closely correlates with the fingertip shape features of the user; and (iv) rotating the rotatable carousel by means of the carousel actuation device 230 to the selected position where the particular one of the plurality of fingernail molds that most closely correlates with the fingertip shape features of the user is in an operative position for forming the artificial fingernail (e.g., matching a thumb fingernail of the user with the mold intended for the thumb, matching an index fingernail of the user with the mold intended for the index finger, etc.). Referring again to FIG. 12, it can be seen that rotatable carousel is operatively coupled to the carousel actuation device 230 by an actuator shaft 240 (i.e., the actuator shaft 240 imparts the rotary motion of the actuation device 230 to the carousel).

In addition, as shown in FIG. 12, in the second illustrative embodiment, the data processor 254 may also control the dispenser actuation device 250, which automatically dispenses the artificial fingernail molding material (e.g., polygel) from the active syringe 223 by means of the dispenser rod 252 acting on the plunger 224 of the syringe 223.

It is readily apparent that the aforedescribed apparatus 100, 200 for forming and applying artificial fingernails offers numerous advantages. First, the apparatus 100, 200 is able to create an almost perfectly formed nail that needs little, if any, refining work to the shape once formed. Secondly, the apparatus 100, 200 contains all of the messy forming material, and by its very nature, the apparatus 100, 200 keeps the process extremely clean. In fact, the only contact the user has with the gel material happens inside a molded cavity, so once injected and formed solid, the user will not have any interaction with messy liquids, gels or glues. Thirdly, the apparatus 100, 200 is a time and money saver since the process is simplified and almost no refinement is needed. Whether the user is at home with the machine or is using it in a nail salon with the help of a nail technician, everyone involved will see the cost and time savings. Lastly, the use of visual scanning and artificial intelligence (AI) allows the user a perfect fit by the apparatus understanding which mold block fits best and automatically spinning the carousel to the right position.

Additional advantages of the apparatuses 100, 200 described above may include: (i) the unique mold design self-aligns the fingernail using a docking lip 144 in the mold (see FIG. 10) so that the fingernail is always placed correctly to accept the liquid gel; (ii) gel is injection molded at room temp, then cured/hardened in place; (iii) mold blocks 142, 142', 143, 143' can easily be switched out to give users twenty (20) different nail styles (as diagrammatically represented by arrow 151 in FIG. 9); (iv) polygel syringes 124, 223 are easily screwed into place when refills are needed; (v) polygel syringes 124, 223 can be supplied in a multitude of colors so you can form a colored nail rather than having to paint it; and (vi) polygel can be infused with "sparkles" to give a fully formed nail with unique aesthetics.

The following is a list of reference characters that are utilized in the drawings of this application together with the components that they are used to represent:

100 Fingernail Apparatus (First Embodiment)
101 Housing Latching Device
102 Lower Housing
104 Upper Housing
106 Finger Aperture
108 Light Source Aperture (Cure Window)
109 Hinges of Housing
110 Slot of Manual Dispenser Actuation Device
120 Dispenser Actuation Device
121 Actuator Paddle Contacts Plunger
122 Actuator Rod
123 Plunger of Syringe
124 Syringe
125 Syringe Carriage (syringe snaps in)
126 Compression Spring (compressed when mold block opens)
127 Mold Block Paddle
128 Ring Member (paddles engage with this component)
130 Manual Carousel Actuation Device (also opens up mold block)
132 Shaft Assembly
133 Rotation Limiter
134 Housing Slot
135 Mold Block Holder
140 Fingernail Mold Holder
142 Top of the Mold (First Version)
142' Top of the Mold (Second Version)
143 Bottom of the Mold (First Version)
143' Bottom of the Mold (Second Version)
144 Docking Edge of Fingernail 146 Mold Side Plates
147 Mold Rod
148 Mold Screws
149 Mold Screw Apertures
150 Polygel
151 Arrow Denoting Switching Out of Molds
152 Polygel Injection Port
154 Polygel Cavity
160 Finger of User
161 Fingernail of User
165 Hand of User
167 Hand Holding Ultraviolet Flashlight
180 Ultraviolet Flashlight
200 Fingernail Apparatus (Second Embodiment)
202 Lower Housing
204 Upper Housing
223 Syringe
224 Plunger of Syringe
230 Carousel Actuation Device (Motor)
240 Actuator Shaft
250 Dispenser Actuation Device
252 Dispenser Rod
254 Data Processor (printed circuit board with microprocessor)
260 Camera
264 Finger Placement Bed
265 Finger of User
270 Mapping of Nail Edge
280 Ultraviolet LED Lamp Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. An apparatus for forming and applying artificial fingernails, the apparatus comprising:
a housing;
a rotatable carousel disposed at least partially within the housing, the rotatable carousel including a plurality of fingernail molds that are configured to be rotated with the carousel, the plurality of fingernail molds configured to form a plurality of different fingernail shapes using an artificial fingernail molding material;
a dispensing device disposed at least partially within the housing, the dispensing device configured to dispense the artificial fingernail molding material onto a fingertip portion of a user within a selected one of the plurality of fingernail molds; and
a curing device, the curing device configured to cure the artificial fingernail molding material on the fingertip portion of the user so as to form an artificial fingernail having a particular shape.

2. The apparatus according to claim 1, further comprising at least one camera configured to capture one or more images of the fingertip portion of the user, the one or more images of the fingertip portion of the user defining shape characteristics of the fingertip portion of the user.

3. The apparatus according to claim 2, further comprising a carousel actuation device for rotating the rotatable carousel to a selected position.

4. The apparatus according to claim 3, further comprising a data processor operatively coupled to the at least one camera and the carousel actuation device of the rotatable carousel, the data processor including at least one hardware component, the data processor configured to execute computer executable instructions, the computer executable instructions comprising instructions for:
receiving the one or more images of the fingertip portion of the user from the at least one camera;
extracting fingertip shape features of the user from the one or more images of the fingertip portion for providing inputs to an artificial intelligence algorithm;
determining, by using the artificial intelligence algorithm, a particular one of the plurality of fingernail molds that most closely correlates with the fingertip shape features of the user; and
rotating the rotatable carousel by means of the carousel actuation device to the selected position where the particular one of the plurality of fingernail molds that most closely correlates with the fingertip shape features of the user is in an operative position for forming the artificial fingernail.

5. The apparatus according to claim 2, wherein the at least one camera comprises a three dimensional camera, and the one or more images of the fingertip portion of the user captured by the at least one camera comprises one or more three dimensional images of the fingertip portion of the user.

6. The apparatus according to claim 2, wherein the at least one camera comprises a plurality of cameras disposed at different locations around the fingertip portion of the user so as to capture images of the fingertip portion from different viewing angles.

7. The apparatus according to claim 1, further comprising a finger aperture disposed in a side of the housing, the finger aperture configured to allow the fingertip portion of the user to be inserted into the selected one of the plurality of fingernail molds.

8. The apparatus according to claim 1, wherein the curing device comprises an ultraviolet light source and the artificial fingernail molding material comprises a polygel material, the ultraviolet light source configured to cure the polygel material on the fingertip portion of the user so as to form the artificial fingernail having the particular shape.

9. The apparatus according to claim 8, wherein at least one of the plurality of fingernail molds is transparent to ultraviolet light produced by the ultraviolet light source so as to allow the polygel material on the fingertip portion of the user to be cured inside the at least one of the plurality of fingernail molds.

10. The apparatus according to claim 1, wherein at least some of the plurality of different fingernail shapes formed by the plurality of fingernail molds correspond to fingertip portions of different fingers of the user.

11. The apparatus according to claim 1, wherein the dispensing device comprises at least one syringe configured to dispense the artificial fingernail molding material onto the fingertip portion of the user within the selected one of the plurality of fingernail molds.

12. The apparatus according to claim 11, further comprising a dispenser actuation device operatively coupled to the at least one syringe, the dispenser actuation device configured to engage a plunger of the syringe so as to dispense the artificial fingernail molding material onto the fingertip portion of the user.

13. The apparatus according to claim 11, wherein the artificial fingernail molding material comprises a polygel material, and the at least one syringe is preloaded with polygel material.

14. The apparatus according to claim 1, wherein the curing device is disposed at least partially within the housing.

15. The apparatus according to claim 1, wherein the curing device is disposed outside the housing.

16. The apparatus according to claim 15, wherein the curing device comprises an ultraviolet flashlight disposed outside of the housing.

* * * * *